(12) United States Patent
Tamaki

(10) Patent No.: US 10,784,926 B2
(45) Date of Patent: Sep. 22, 2020

(54) SIGNAL TRANSMISSION APPARATUS, SIGNAL TRANSMISSION SYSTEM, AND INSTRUMENT

(71) Applicant: CANON KABUSHIKI KAISHA, Tokyo (JP)

(72) Inventor: Hiroto Tamaki, Misato (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/204,361

(22) Filed: Nov. 29, 2018

(65) Prior Publication Data

US 2019/0097683 A1    Mar. 28, 2019

Related U.S. Application Data

(63) Continuation of application No. PCT/JP2017/019649, filed on May 26, 2017.

(30) Foreign Application Priority Data

Jun. 9, 2016 (JP) .................................. 2016-115663

(51) Int. Cl.
*H04B 3/54*    (2006.01)
*H04L 25/02*    (2006.01)
(Continued)

(52) U.S. Cl.
CPC .............. *H04B 3/548* (2013.01); *B25J 19/00* (2013.01); *B25J 19/027* (2013.01);
(Continued)

(58) Field of Classification Search
CPC ......... B25J 19/027; B25J 19/00; H04B 3/548; H04B 10/114; H04B 10/116; H04L 25/02
See application file for complete search history.

(56) References Cited

U.S. PATENT DOCUMENTS

| 5,712,552 A | 1/1998 | Hirai |
| 7,175,249 B2 | 2/2007 | Hongo |

(Continued)

FOREIGN PATENT DOCUMENTS

| JP | 60-25334 | 2/1985 |
| JP | S60-25334 | 2/1985 |

(Continued)

OTHER PUBLICATIONS

International Preliminary Report, dated Dec. 20, 2018, during prosecution of related application No. PCT/JP2017/019649. (English-language translation included.).

(Continued)

*Primary Examiner* — Mina M Shalaby
(74) *Attorney, Agent, or Firm* — Venable LLP

(57) ABSTRACT

There is provided a configuration that can prevent malfunction in bus communication even when a radio signal transmitted from a transmitter of an apparatus is received with a receiver of the same apparatus. A logic circuit outputs logic 1 to a transmitter in a case where logic 0 is input from a receiver to the logic circuit and a low-level logic signal is input from a processor to the logic circuit. The logic circuit outputs the low-level logic signal to the processor in a case where the logic 1 is input from the receiver and a radio signal received with the receiver is a radio signal transmitted from a communication counterpart. The logic circuit outputs a high-level logic signal to the processor in a case where the logic 1 is input from the receiver and a radio signal received with the receiver is a radio signal transmitted from the transmitter.

29 Claims, 10 Drawing Sheets

(51) Int. Cl.
  *B25J 19/00* (2006.01)
  *H04B 10/114* (2013.01)
  *B25J 19/02* (2006.01)
  *H04B 10/116* (2013.01)
(52) U.S. Cl.
  CPC ......... *H04B 10/114* (2013.01); *H04B 10/116* (2013.01); *H04L 25/02* (2013.01)

(56) References Cited

U.S. PATENT DOCUMENTS

| | | | |
|---|---|---|---|
| 7,780,257 B2 | 8/2010 | Hongo | |
| 9,515,027 B2 | 12/2016 | Tamaki | |
| 2014/0023365 A1* | 1/2014 | Xi | G02B 6/3816 398/58 |

FOREIGN PATENT DOCUMENTS

| | | |
|---|---|---|
| JP | 7-100786 | 4/1995 |
| JP | 2000-156673 | 6/2000 |
| JP | 2011-71638 | 4/2011 |
| WO | 2009/133633 | 11/2009 |

OTHER PUBLICATIONS

European Search Report dated Sep. 27, 2019 during prosecution of European application No. 17810123.4.
Japanese Office Action dated Jun. 30, 2020 in corresponding Japanese application No. 2016-115663 (whole English translation included).

* cited by examiner

| IN1 | IN2 | OUT1 | OUT2 | STATE |
|---|---|---|---|---|
| H | 0 | H | 0 | S0 |
| H | 1 | H | 0 | S3 |
| H | 1 | L | 0 | S4 |
| L | 0 | H | 1 | S1 |
| L | 0 | H | 0 | S6 |
| L | 1 | H | 1 | S2 |
| L | 1 | L | 0 | S5 |

SIGNAL TRANSMISSION APPARATUS, SIGNAL TRANSMISSION SYSTEM, AND INSTRUMENT

CROSS-REFERENCE TO RELATED APPLICATIONS

This application is a Continuation of International Patent Application No. PCT/JP2017/019649, filed May 26, 2017, which claims the benefit of Japanese Patent Application No. 2016-115663, filed Jun. 9, 2016, both of which are hereby incorporated by reference herein in their entirety.

BACKGROUND OF THE INVENTION

Field of the Invention

The present invention relates to a signal transmission apparatus, a signal transmission system, and an instrument that wirelessly transmit a signal in bus communication.

Description of the Related Art

To enhance the function and performance of an automobile, a large number of electronic control units (ECUs) have been employed. If these ECUs are connected to each other and allowed to communicate with each other, a tremendous amount of wiring is required, resulting in increase in weight and cost. To reduce the amount of wiring and satisfy a requirement of high-speed communication of a large amount of data, a control area network (CAN) has been developed.

In recent years, it has been recognized that a CAN has high reliability, for example, in a failure detection function, and a CAN is therefore used in a variety of fields, such as elevators, railways, airplanes, ships, and medical instruments. Further, there is also a case where a CAN is used in a manufacturing apparatus and an inspection apparatus installed, for example, in a factory to achieve distributed control in the apparatuses.

On the other hand, in a production line, for example, in a factory, an industrial robot performs assembly and other types of work. The robot includes a multi-joint robot arm and an end effector provided as the front end of the robot arm. A drive control apparatus that controls a driving apparatus that drives each of the joints of the robot arm is provided at the joint, and it is planned to employ a CAN for communication between each of the drive control apparatuses and the robot control apparatus.

To incorporate bus wires in the robot arm and prevent the bus wire disconnection in a joint of the robot arm, particularly in a rotary joint, it has been necessary to use expensive dedicated wires and route the wires in a special manner.

A rotary joint with bus wires routed therein cannot rotate endlessly, and routing the bus wires therefore restricts the action of the robot arm, resulting in a decrease in the flexibility of the action of the robot arm.

To avoid the problem, it is conceivable to use a slip ring to achieve endless rotation, but the slip ring uses a mechanical contact, resulting in a problem of increase in weight and size of the robot. Further, the slip ring needs to undergo frequent maintenance to avoid contact failure due to wear of the brush and other components.

To achieve a non-contact CAN bus, International Publication No. WO2009/133633 proposes a configuration in which a signal transmission apparatus wirelessly transmits a signal. In International Publication No. WO2009/133633, a pair of remote coupler apparatuses are provided as the signal transmission apparatus, and the pair of remote coupler apparatuses wirelessly connect a pair of bus wires to each other. The remote coupler apparatuses each include an input/output signal control apparatus, a modulator, a resonator, and a demodulator.

The remote coupler apparatuses described in International Publication No. WO2009/133633 are so adapted that a radio signal transmitted from the resonator connected to the modulator in one of the remote coupler apparatuses is received with the resonator connected to the demodulator of the other remote coupler apparatus. However, due to the restriction resulting from the arrangement of the modulators, demodulators, and resonators, there is a situation in which the resonator connected to the modulator of the one remote coupler apparatus and the resonator connected to the demodulator of the same remote coupler apparatus cannot be isolated from each other. In a robot arm, for example, the remote coupler apparatuses need to be disposed in a narrow space in a joint, and there is therefore a situation in which it is difficult to isolate the resonators of the same remote coupler apparatus from each other. Under such a situation, the radio signal transmitted from the resonator connected to the modulator of one of the remote coupler apparatuses is also received with the resonator connected to the demodulator of the same remote coupler apparatus, possibly resulting in malfunction. The problem described above is not limited to the radio-wave-based wireless communication described in International Publication No. WO2009/133633 and can occur in every wireless communication between a transmitter and receiver, such as wireless communication using light (infrared light, for example) and wireless communication using one of an electric field and a magnetic field.

SUMMARY OF THE INVENTION

An object of the present invention is to achieve a configuration that can avoid malfunction in bus communication even when a radio signal transmitted from a transmitter of an apparatus is received with a receiver of the same apparatus.

According to a viewpoint of the prevent invention, a signal transmission apparatus includes a processor connected to a bus wire including a pair of signal lines, a controller connected to the processor, and a transmitter and a receiver connected to the controller. The processor produces a logic signal having one of a first level representing that a signal is present and a second level representing that no signal is present in accordance with a potential difference between the pair of signal lines. The light receiver produces a signal representing one of a reception flag and a non-reception flag in accordance with magnitude of a received radio signal. The controller controls a state of transmission of a radios signal from the transmitter based on the logic signal produced by the processor and the signal produced by the light receiver.

Further features of the present invention will become apparent from the following description of exemplary embodiments with reference to the attached drawings.

DESCRIPTION OF THE EMBODIMENTS

Figure 1:
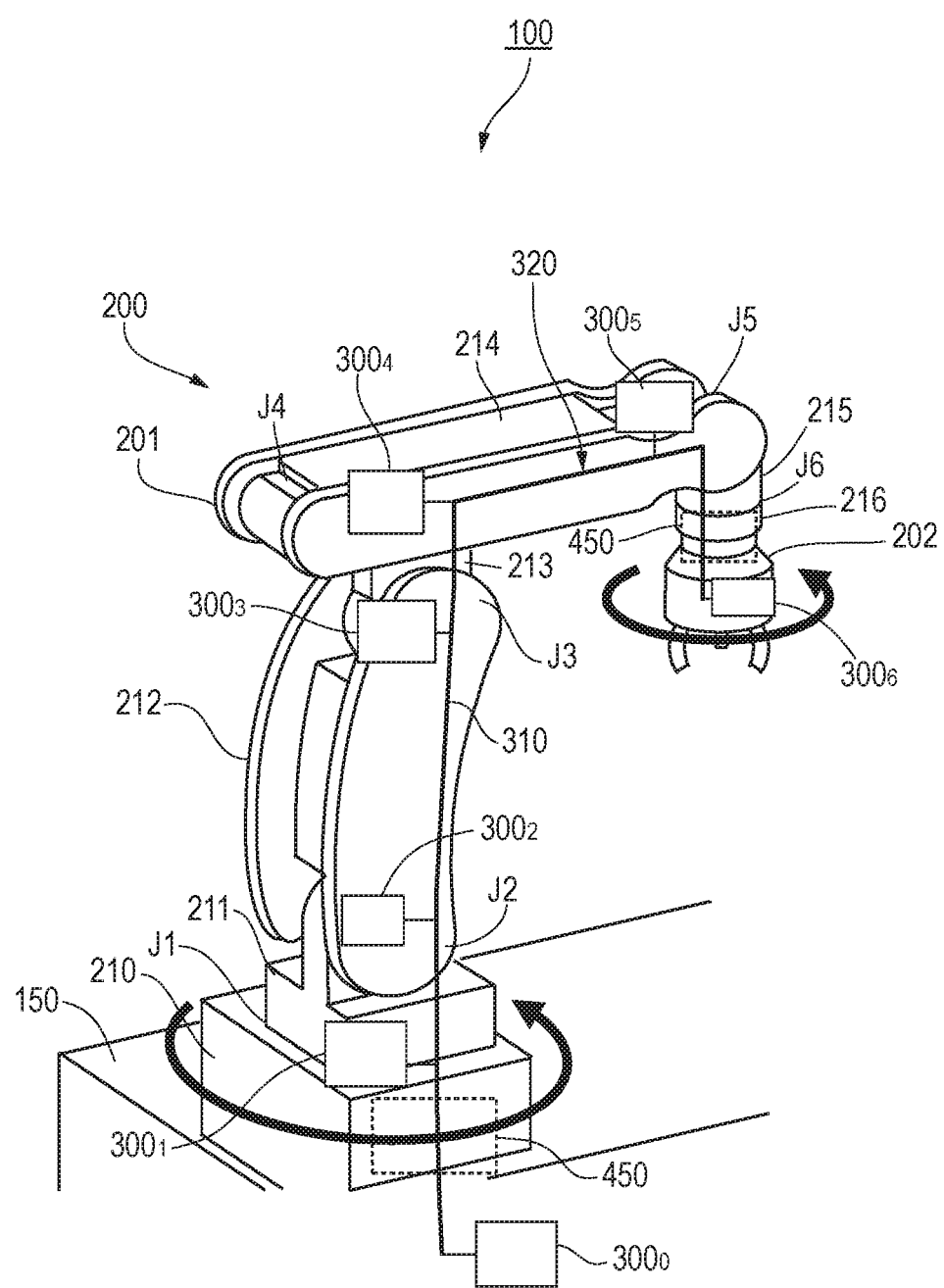
FIG. 1 is a perspective view illustrating a robot apparatus as an example of an instrument according to an embodiment.

A form for implementing the present invention will be described below in detail with reference to the drawings. FIG. 1 is a perspective view illustrating a robot apparatus as an example of an instrument according to an embodiment.

A robot apparatus 100, which is the instrument, includes a robot 200 and an electronic control unit $300_0$, which is a robot control apparatus that controls the robot 200. The robot 200 is fixed to a mount 150. The robot 200 includes a vertical multi joint robot arm 201 and a robot hand 202, which is attached to the front end of the robot arm 201 and serves as an end effector that is a terminal portion of the robot 200.

The robot arm 201 includes a plurality of links 210 to 216 swingably or rotatably linked to each other via joints J1 to J6. In the present embodiment, the robot arm 201 includes six joints J1 to J6 including four joints that each swing and two joints that each rotate. A joint that swings is called a swing joint, and a joint that rotates is called a rotary joint. In the robot arm 201, the joints J1 and J6 are each the rotary joint, and the joints J2, J3, J4, and J5 are each the swing joint. The joint J1 allows the link 211 to rotate relative to the link 210 in opposite directions by at least 360 degrees, and the joint J6 allows the link 216 to rotate relative to the link 215 in opposite directions by at least 360 degrees.

The joints J1 to J6 of the robot arm 201 are provided with drive apparatuses that are not illustrated but drive the joints and electronic control units $300_1$ to $300_6$, which control the drive apparatuses. The drive apparatuses that are not illustrated each include a motor and a speed reducer. The electronic control units $300_0$ to $300_6$ are connected to each other via a bus wire 310 in a communicable manner to form a bus communication system 320. The bus wire 310 is so provided as to be routed through one of the interior and exterior of the robot arm 201.

The electronic control unit $300_0$ outputs to each of the electronic control units $300_1$ to $300_6$ via the bus wire 310 a data signal (digital signal) carrying a position instruction value representing a target rotary position of the shaft of the motor. The electronic control units $300_1$ to $300_6$ each acquire a value detected with a rotary encoder attached to the motor and controls the rotation of the motor in such a way that the detected value approaches the input position instruction value. Further, the electronic control units $300_1$ to $300_6$ each output a data signal (digital signal) carrying the detected value to the electronic control unit $300_0$ via the bus wire 310.

In the bus communication system 320, a control area network (CAN) is employed to achieve high-speed communication of a large amount of data. In the present embodiment, the electronic control units $300_0$ to $300_6$ are each a node connected to the bus wire 310. In the following description, the electronic control units $300_0$ to $300_6$ are collectively called electronic control units 300.

Figure 2:
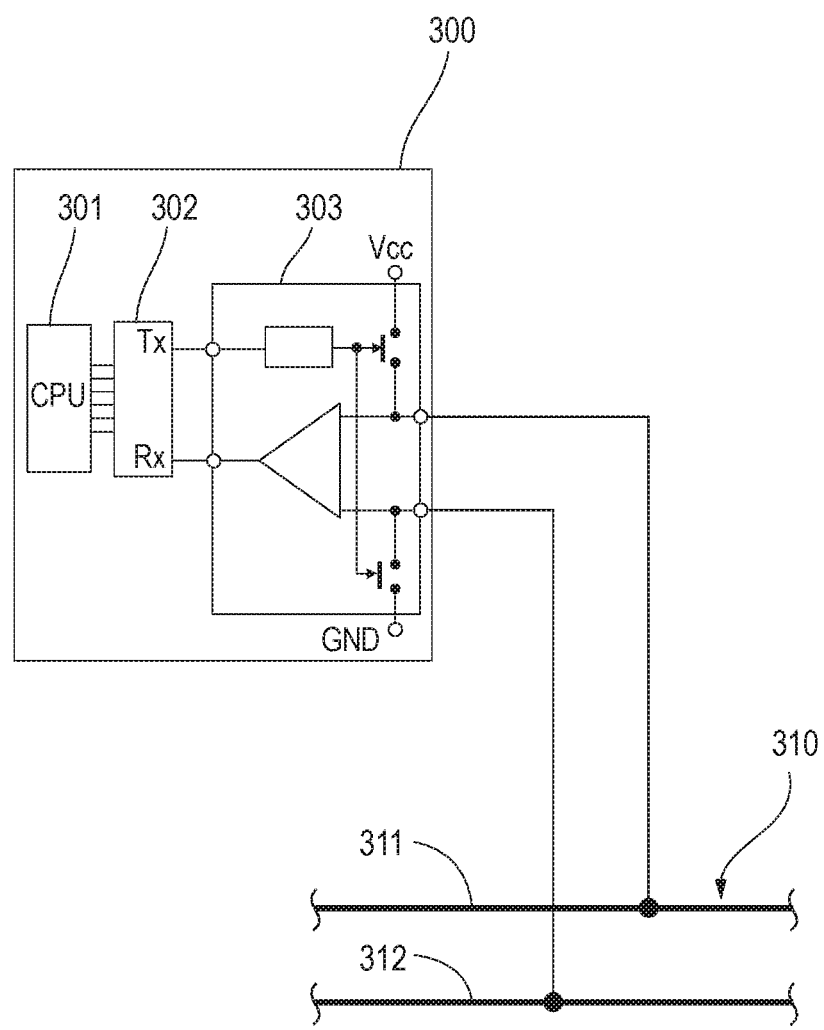
FIG. 2 is a descriptive diagram illustrating the configuration of an electronic control unit according to the embodiment.

FIG. 2 is a descriptive diagram illustrating the configuration of each of the electronic control units according to the embodiment. The electronic control units 300 each include a central processing unit (hereinafter referred to as CPU) 301, a CAN controller 302, and a CAN transceiver 303. The bus wire 310 includes a pair of signal lines 311 and 312.

The CPU 301 performs a variety of types of computation necessary for the control of the robot 200 and other types of processing, issues a communication instruction to the CAN controller 302 when communication with another node is necessary, and processes data to be transmitted and data having been received. The data includes a bit train including logic 0 and logic 1 and transmitted and received as a parallel signal to and from the CPU 301 and the CAN controller 302 and vice versa.

The CAN controller 302 provides the functions of the CAN protocol, such as conversion of a message into a frame, communication arbitration, error handling, ACK transmission, and CRC checking. The CAN controller 302 converts the parallel signal acquired from the CPU 301 into a serial signal that is a single-end signal expressed in the form of a voltage level that is one of a high level (logic 0) and a low level (logic 1) and outputs the serial signal to the CAN transceiver 303. The CAN controller 302 further converts a serial signal input thereto into a parallel signal and outputs the parallel signal to the CPU 301.

The CAN transceiver 303 provides a differential physical interface between the CAN controller 302 and the bus wire 310. That is, the CAN transceiver 303 converts the single-end signal from the CAN controller 302 into differential signals or converts differential signals into a single-end signal.

In a specific description, the CAN transceiver 303 applies a relatively low potential difference to the bus wire 310 (recessive), upon reception of an input of the high-level signal representing the logic-0 data from the CAN controller 302. On the other hand, the CAN transceiver 303, upon reception of an input of the low-level signal representing the logic-1 data from the CAN controller 302, applies a relatively high potential difference to the bus wire 310 (dominant).

In the case where the bus wire 310 has a relatively high potential difference, which corresponds to the dominant state, the CAN transceiver 303 outputs a low-level voltage signal to the CAN controller 302. On the other hand, in the case where the bus wire 310 has a relatively low potential difference, which corresponds to the recessive state, the CAN transceiver 303 outputs a high-level voltage signal to the CAN controller 302.

Further, the CAN transceiver 303 also serves to adjust and assure working current and protect the wires from ESD and other incoming noise.

In a case where the electronic control units (nodes) 300 connected to one another via the bus wire 310 need to communicate with one another, data to be transmitted is delivered from the CPU 301 to the CAN controller 302. The CAN controller 302 controls the CAN transceiver 303 in accordance with the CAN protocol to provide the bus wire 310 with a voltage difference (differential signals). The CAN transceiver 303 at each of the nodes converts the potential difference in the bus wire 310 into a single-end signal, which is processed by the CAN controller 302 in accordance with the protocol, and only data necessary for the CPU 301 is delivered thereto. Communication among the electronic control units (nodes) 300 connected to one another via the bus wire 310 is thus achieved.

Figure 3:
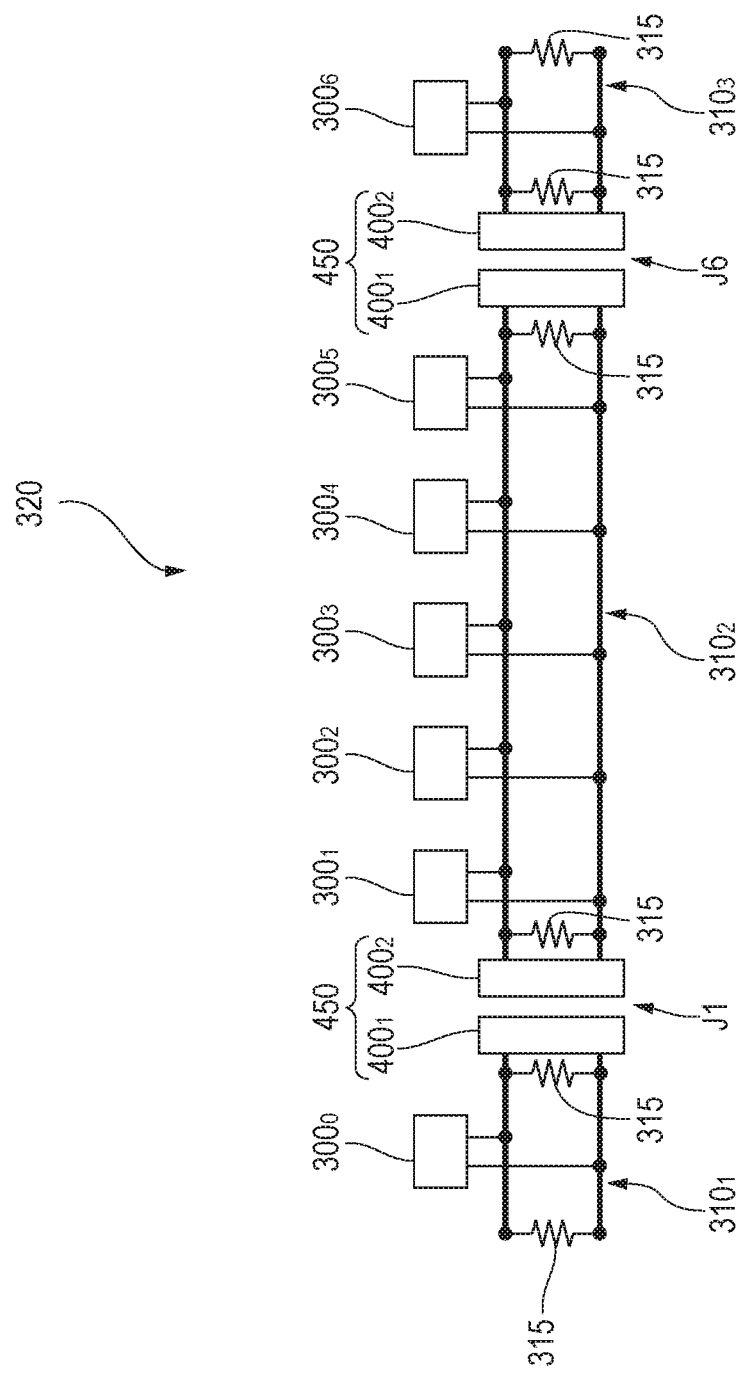
FIG. 3 is a descriptive diagram illustrating a bus communication system according to the embodiment.

FIG. 3 is a descriptive diagram illustrating the bus communication system 320 according to the embodiment. To allow the links to freely rotate at the joints J1 and J6, the bus wire 310 is physically divided into a plurality of bus wires $310_1$, $310_2$, and $301_3$, as illustrated in FIG. 3. A signal transmission system 450, which performs wireless communication, is disposed between the bus wire $310_1$ and the bus wire $310_2$ and between the bus wire $310_2$ and the bus wire $310_3$. The signal transmission systems 450 each include a pair of signal transmission apparatuses $400_1$ and $400_2$, which wirelessly communicate with each other (non-contact communication). The signal transmission systems 450 are disposed in the joints J1 and J6.

That is, the electronic control unit $300_0$ and the electronic control units $300_1$, $300_2$, $300_3$, $300_4$, $300_5$, and $300_6$ perform data communication via the signal transmission systems 450 disposed in the joints J1 and J6. A terminating resistor 315 is provided at each of the opposite ends of each of the bus wires $310_1$ to $310_3$. The terminating resistors 315 prevent reflection of a signal at each of the opposite ends of each of the bus wires $310_1$ to $310_3$, whereby the voltage across each of the bus wires is optimized.

The signal transmission systems 450 disposed in the joints J1 and J6 have the same configuration, and the following description will therefore be made of the signal transmission system 450 disposed in the joint J1, which is one of the joints J1 and J6. Further, the following description will be made of a case where data communication is performed between the electronic control units $300_0$ and $300_1$ for ease of description. Although the signal transmission system 450 is disposed in each of the rotary joints of the robot arm 201, the signal transmission system 450 may instead be disposed in at least one of the rotary joints. For example, the signal transmission system 450 may be disposed in one of the joints J1 and J6, and a toggle wire or a slip ring may be used in the other joint.

Figure 4:
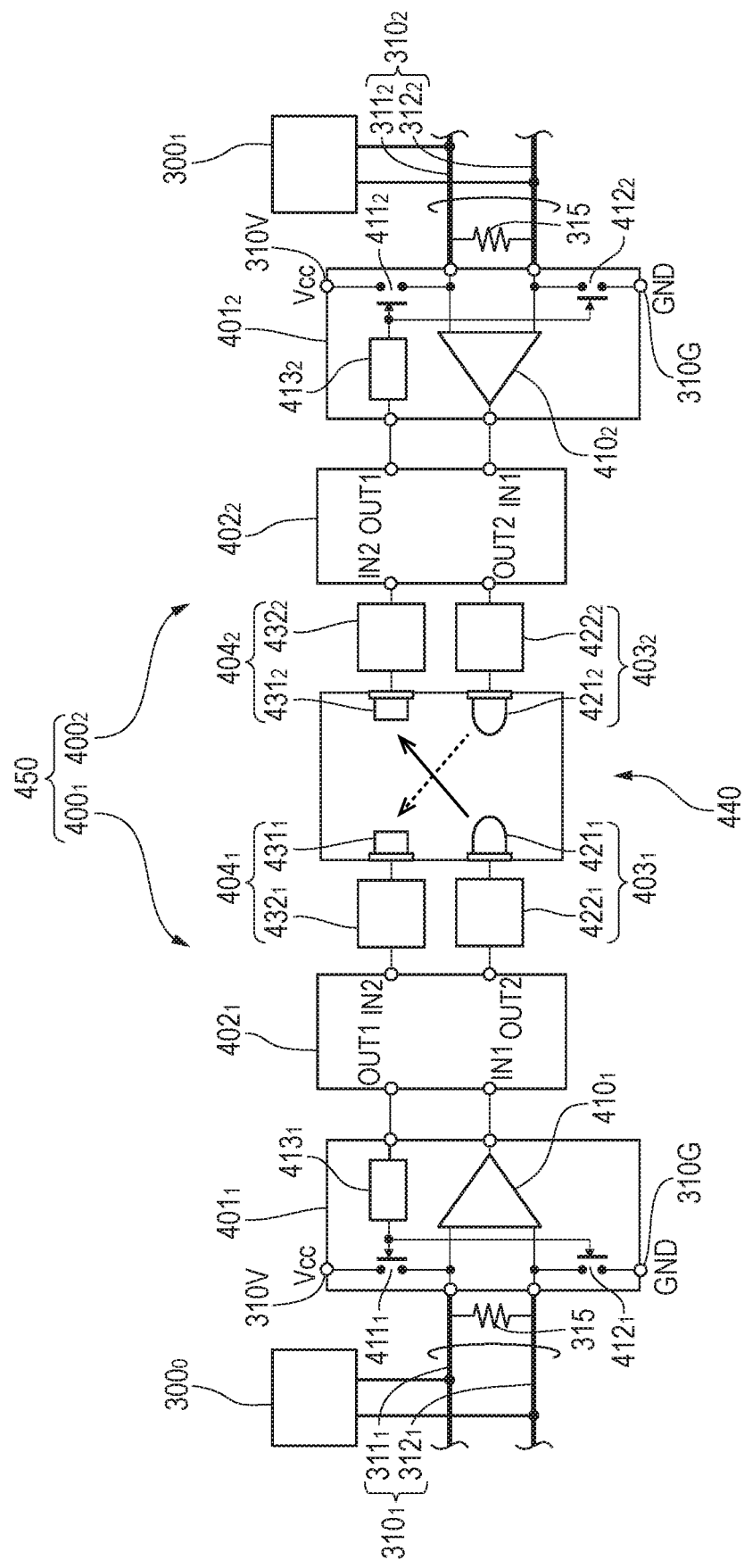
FIG. 4 is a descriptive diagram illustrating a signal transmission system according to the embodiment.

FIG. 4 is a descriptive diagram illustrating each of the signal transmission systems according to the embodiment. FIG. 4 illustrates the signal transmission system 450 provided in the joint J1, which is a rotary joint, and including a pair of signal transmission apparatuses. The bus wire $310_1$ includes a pair of signal lines $311_1$ and $312_1$, and the bus wire $310_2$ includes a pair of signal lines $311_2$ and $312_2$.

The signal transmission system 450 includes a signal transmission apparatus $400_1$, which is connected to the bus wire $310_1$, and a signal transmission apparatus $400_2$, which is connected to the bus wire $310_2$. The communication counterpart of the signal transmission apparatus $400_1$ is the signal transmission apparatus $400_2$, and the communication counterpart of the signal transmission apparatus $400_2$ is the signal transmission apparatus $400_1$. Short-range bidirectional communication is therefore performed between the pair of signal transmission apparatuses $400_1$ and $400_2$.

The signal transmission apparatus $400_1$ includes a communication controller including a processor $401_1$, which is connected to the bus wire $310_1$, and a logic circuit $402_1$, which is a controller connected to the processor $401_1$, and a transceiver including a transmitter $403_1$ and a receiver $404_1$, which are connected to the logic circuit $402_1$.

The processor $401_1$ has the same configuration as that of the CAN transceiver 303 and operates in accordance with the CAN protocol. That is, the processor $401_1$ outputs a logic signal (single-end signal) having one of the low level, which is a first level representing that a signal is present, and the high level, which is a second level representing that no signal is present, in accordance with the potential difference in the bus wire $310_1$ to the logic circuit $402_1$. Further, the processor $401_1$ gives the bus wire $310_1$ a potential difference (differential signals) according to a logic signal (single-end signal) input from the logic circuit $402_1$.

For example, the processor $401_1$ outputs the high-level logic signal to the logic circuit $402_1$ when the potential difference in the bus wire $310_1$ is no greater than 0.5 [V], which corresponds to the recessive state. On the other hand, the processor $401_1$ outputs the low-level logic signal to the logic circuit $402_1$ when the potential difference in the bus wire $310_1$ is at least 0.9 [V], which corresponds to the dominant state. When the high-level logic signal is input from the logic circuit $402_1$ to the processor $401_1$, the output impedance from the processor $401_1$ to the bus wire $310_1$ is set at the high impedance. Further, when the low-level logic signal is input from the logic circuit $402_1$ to the processor $401_1$, the processor $401_1$ causes current to flow through the bus wire $310_1$ to set the state of the bus wire $310_1$ to be the dominant state.

The configuration of the processor $401_1$ will be specifically described. The processor $401_1$ includes a converter $410_1$, a transistor $411_1$, which is a first switching element, a transistor $412_1$, which is a second switching element, and a driver $413_1$.

The converter $410_1$ outputs the low-level (first-level) logic signal to the logic circuit $402_1$ when the bus wire $310_1$ has a relatively high potential difference, which corresponds to the dominant state. The converter $410_1$ outputs the high-level (second-level) logic signal to the logic circuit $402_1$ when the bus wire $310_1$ has a relatively low potential difference, which corresponds to the recessive state.

The transistors $411_1$ and $412_1$ are each, for example, any of a bipolar transistor, an FET (MOSFET, for example), and an IGBT. The transistor $411_1$ is connected to the signal line $311_1$, which is one of the pair of signal lines that form the bus wire $310_1$, and a power line 310V, to which DC voltage Vcc is applied, in such a way that the transistor $411_1$ is located between the signal line $311_1$ and the power line 310V. The transistor $411_1$ in the ON state causes the signal line $311_1$ to be electrically continuous with the power line 310V, and the transistor $411_1$ in the OFF state cuts the electrical continuity between the signal line $311_1$ and the power line 310V. A circuit element, such as a resistive element, may be connected in series to the transistor $411_1$. The transistor $412_1$ is connected to the signal line $312_1$, which is the other one of the pair of signal lines that form the bus wire $310_1$, and a ground line 310G in such a way that the transistor $412_1$ is located between the signal line $312_1$ and the ground line 310G. The transistor $412_1$ in the ON state causes the signal line $312_1$ to be electrically continuous with the ground line 310G, and the transistor $412_1$ in the OFF state cuts the electrical continuity between the signal line $312_1$ and the ground line 310G. A circuit element, such as a resistive element, may be connected in series to the transistor $411_2$. The term "cut" means that the amount of current flowing through any of the switching elements is smaller than the amount in the ON state of the switching element. For example, even in a state in which the gate (base) of the switching element is not driven, leakage current is present between the drain and the source (emitter and collector) of the switching element. The term "cut" therefore includes the state in which the leakage current flows.

The driver $413_1$ turns off the transistors $411_1$ and $412_1$ when the high-level (second-level) logic signal is input from the logic circuit $402_1$ to the driver $413_1$. When the transistors $411_1$ and $412_1$ operate in the OFF state, the current supply to the bus wire $310_1$ via the transistors $411_1$ and $412_1$ is cut, and when no potential difference is applied from the electronic control unit $300_0$, the bus wire $310_1$ operates in the recessive state.

When the low-level (first-level) logic signal is input from the logic circuit $402_1$ to the driver $413_1$, the driver $413_1$ turns on the transistors $411_1$ and $412_1$. When the transistors $411_1$ and $412_1$ operate in the ON state, the current sequentially flows through the power line 310V, the transistor $411_1$, the signal line $311_1$ of the bus wire $310_1$, the terminating resistor 315, the signal line $312_1$ of the bus wire $310_1$, the transistor $412_1$, and the ground line 310G. The pair of signal lines $311_1$ and $312_1$ are thus given a potential difference, so that the bus wire $310_1$ operates in the dominant state.

The transmitter $403_1$ includes a light emitting element $421_1$, which emits (transmits) an optical signal as a radio signal, and a light emission circuit $422_1$ connected to the light emitting element $421_1$, which controls the intensity of the light emitted from the light emitting element $421_1$. The light emitting element $421_1$ is an LED, more specifically, an infrared light emitting diode. The light emission circuit $422_1$ receives input of a signal representing one of a transmission flag (logic 1) and a non-transmission flag (logic 0) from the logic circuit $402_1$. The light emission circuit $422_1$ causes the light emitting element $421_1$ to emit light having at least predetermined intensity when the signal representing the transmission flag (logic 1) is input from the logic circuit $402_1$ to the light emission circuit $422_1$. The light emission circuit $422_1$ causes the light emitting element $421_1$ to emit no light or causes the light emitting element $421_1$ to emit light having intensity lower than predetermined intensity when the signal representing the non-transmission flag (logic 0) is input from the logic circuit $402_1$.

The transmitter $403_1$ therefore transmits a radio signal (optical signal) when the signal representing the transmission flag (logic 1) is input from the logic circuit $402_1$ to the transmitter $403_1$. When no signal representing the transmission flag (logic 1) is input from the logic circuit $402_1$ to the transmitter $403_1$, that is, when the signal representing the non-transmission flag (logic 0) is input from the logic circuit $402_1$ to the transmitter $403_1$, the transmitter $403_1$ transmits no radio signal. The transmission of a radio signal means transmission of a signal having at least predetermined amplitude, and no transmission of a radio signal also includes transmission of a signal having amplitude smaller than the predetermined value.

The signal representing the logic-0 flag is, for example, the low-level voltage signal, and the signal representing the logic-1 flag is, for example, the high-level voltage signal.

The receiver $404_1$ includes a light receiving element $431_1$, which receives an optical signal as a radio signal, and a light reception circuit $432_1$ connected to the light receiving element $431_1$. The light receiving element $431_1$ is one of a photodiode and a phototransistor. The light reception circuit $432_1$ produces an electric signal having amplitude (voltage level) according to the intensity of the light received with the light receiving element $431_1$. The light reception circuit $432_1$ compares the produced electric signal with a threshold and outputs a signal carrying one of a reception flag (logic 1) representing that a radio signal has been received and a non-reception flag (logic 0) representing that no radio signal has been received to the logic circuit $402_1$.

That is, when the amplitude (voltage level) of the electric signal according to the intensity of the light received with the light receiving element $431_1$ is at least the threshold, the light reception circuit $432_1$ determines that a radio signal has been received and outputs the reception flag (logic 1) to the logic circuit $402_1$. On the other hand, when the amplitude (voltage level) of the electric signal according to the intensity of the light received with the light receiving element $431_1$ is smaller than the threshold, the light reception circuit $432_1$ determines that no radio signal has been received and outputs the non-reception flag (logic 0) to the logic circuit $402_1$. As described above, the logic 0 carried by the flag transmitted and received in the communication between the logic circuit $402_1$ and the transmitter $403_1$/receiver $404_1$ represents a relatively weak light state, whereas the logic 1 represents a relatively strong light state.

Therefore, when the receiver $404_1$ has received a radio signal (in the strong light state), the receiver $404_1$ outputs the reception flag (logic 1) representing that a radio signal has been received to the logic circuit $402_1$. On the other hand, when the receiver $404_1$ has received no radio signal (in the weak light state), the receiver $404_1$ outputs the non-reception flag (logic 0) representing that no radio signal has been received to the logic circuit $402_1$.

The signal representing the logic-0 flag is, for example, the low-level voltage signal, and the signal representing the logic-1 flag is, for example, the high-level voltage signal.

The logic circuit $402_1$ has two input ports IN1 and IN2 and two output ports OUT1 and OUT2. The first input port IN1 is connected to the converter $410_1$ in the processor $401_1$, and the second input port IN2 is connected to the light reception circuit $432_1$ in the receiver $404_1$. The first output port OUT1 is connected to the driver $413_1$ in the processor $401_1$, and the second output port OUT2 is connected to the light emission circuit $422_1$ in the transmitter $403_1$.

The logic circuit $402_1$ receives input of one of the high-level logic signal and the low-level logic signal from the converter $410_1$ in the processor $401_1$ via the input port IN1. The logic circuit $402_1$ receives input of one of the logic-0 logical frag (signal) and the logic-1 logical flag from the light reception circuit $432_1$ in the receiver $404_1$ via the input port IN2.

The logic circuit $402_1$ produces one of the high-level logic signal and the low-level logic signal and outputs the logic signal to the driver $413_1$ in the processor $401_1$ via the output port OUT1. The logic circuit $402_1$ produces the logical flag having one of the logic 0 representing the non-transmission flag and the logic 1 representing the transmission flag and outputs a signal representing the logical flag to the light emission circuit $422_1$ in the transmitter $403_1$ via the output port OUT2.

The signal transmission apparatus $400_2$ has the same configuration as that of the signal transmission apparatus $400_1$. That is the signal transmission apparatus $400_2$ includes a communication controller including a processor $401_2$, which is connected to the bus wire $310_2$, and a logic circuit $402_2$, which is a controller connected to the processor $401_2$, and a transceiver including a transmitter $403_2$ and a receiver $404_2$, which are connected to the logic circuit $402_2$. The processor $401_2$ includes a converter $410_2$, a transistor $411_2$, which is the first switching element, a transistor $412_2$, which is the second switching element, and a driver $413_2$. The transmitter $403_2$ includes a light emitting element $421_2$ and a light emission circuit $422_2$, and the receiver $404_2$ includes a light receiving element $431_2$ and a light reception circuit $432_2$.

The transmitters $403_1$ and $403_2$ and the receivers $404_1$ and $404_2$ form another wireless communication unit 440.

Figure 5A:
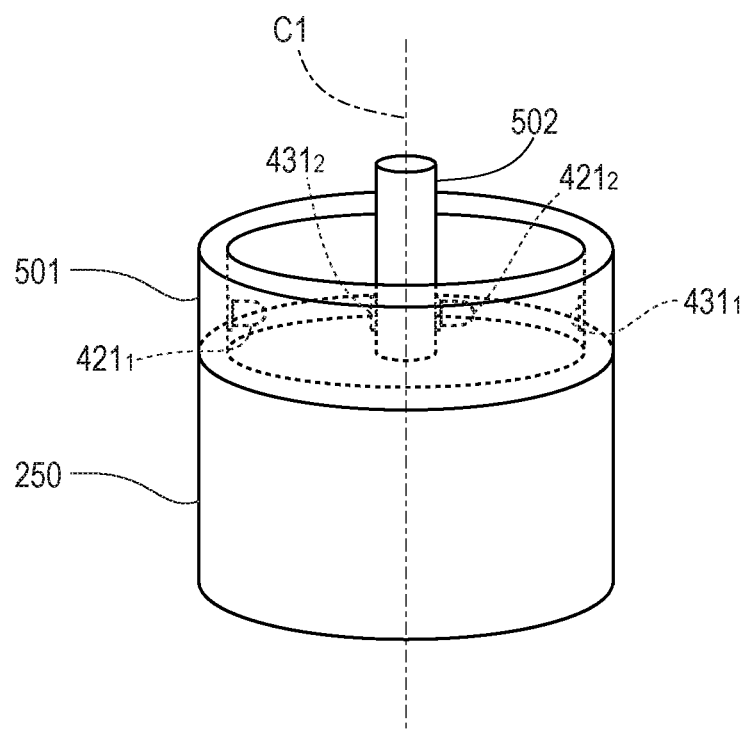
FIG. 5A is a perspective view illustrating a driving apparatus disposed in a rotary joint of a robot arm.

FIG. 5A is a perspective view illustrating the driving apparatus disposed in the joint J1, which is a rotary joint, of the robot arm. The joint J6, which is another rotary joint, has the same configuration and will not therefore be described.

A driving apparatus 250 drives and rotates the link 211, which is one of the pair of the links 210 and 211, relative to the other link 210 and includes a motor (and speed reducer). A cylindrical member 501, which is a first member, is securely attached to the stator of the driving apparatus 250. A shaft member 502, which is a second member, is securely attached to the rotor of the driving apparatus 250. The shaft member 502 is so disposed in the cylindrical member 501 as to be coaxial with the cylindrical member 501 and rotates relative to the cylindrical member 501 around a center axis C1 of the cylindrical member 501. One of the cylindrical member 501 and the shaft member 502 is fixed to the link 210, and the other is fixed to the link 211.

Figure 5B:
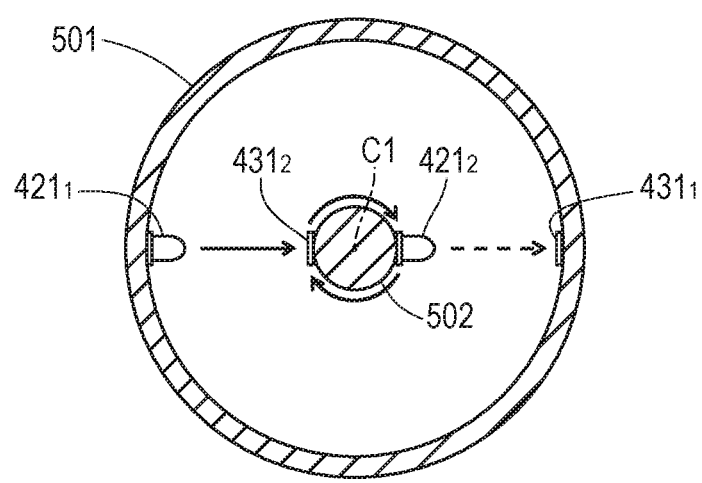
FIG. 5B is a descriptive diagram illustrating the arrangement of a light emitting element and a light receiving element.

FIG. 5B is a descriptive diagram illustrating the arrangement of one set of the light emitting elements and light receiving elements. The light emitting element $421_1$ and the light receiving element $431_1$ of the signal transmission apparatus $400_1$ are disposed as part of one of the cylindrical member 501 and the shaft member 502, specifically, in the cylindrical member 501 in the present embodiment. More specifically, the light emitting element $421_1$ and the light receiving element $431_1$ are fixed to the inner circumferential surface of the cylindrical member 501. The light emitting element $421_2$ and the light receiving element $431_2$ of the signal transmission apparatus $400_2$ are disposed as part of the other one of the cylindrical member 501 and the shaft member 502, specifically, on the shaft member 502 in the present embodiment. More specifically, the light emitting element $421_2$ and the light receiving element $431_2$ are fixed to the outer circumferential surface of the shaft member 502.

The transmission counterpart of the light emitting element $421_1$ disposed in the cylindrical member 501 is the light receiving element $431_2$ disposed on the shaft member 502. The transmission counterpart of the light emitting element $421_2$ disposed on the shaft member 502 is the light receiving element $431_1$ disposed in the cylindrical member 501. The configuration described above allows non-contact communication.

In the present embodiment, the light emitting element $421_1$, the light emitting element $421_2$, the light receiving element $431_1$, and the light receiving element $431_2$ are disposed in the same space that serves as the wireless transmission path, whereby space saving is achieved. The size and weight of the robot arm 201 can thus be reduced, whereby the controllability of the robot arm 201 is improved.

Further, the space in which the pair of the light emitting element $421_1$ and the light receiving element $431_2$ are disposed and the space in which the pair of the light emitting element $421_2$ and the light receiving element $431_1$ are disposed may not be separate from each other. Moreover, the wavelength of the light used in the communication between the light emitting element $421_1$ and the light receiving element $431_2$ may not differ from the wavelength of the light used in the communication between the light emitting element $421_2$ and the light receiving element $431_1$. Therefore, the light emitting elements $421_1$ and $421_2$ can be formed of elements (LEDs, for example) compliant with the same standard, and the light receiving elements $431_1$ and $431_2$ can be formed of elements (PDs, for example) compliant with the same standard.

Since the light emitting element $421_1$, the light emitting element $421_2$, the light receiving element $431_1$, and the light receiving element $431_2$ are disposed in the same space, the light emitted from the light emitting element $421_1$ is received also with the light receiving element $431_1$. Similarly, the light emitted from the light emitting element $421_2$ is received also with the light receiving element $431_2$. Therefore, in the present embodiment, the logic circuits $402_1$ and $402_2$ of the signal transmission apparatuses $400_1$ and $400_2$ operate as shown in the following conditions in the wireless transmission operation.

Condition 1: When the logical high level is input to the input port IN1, the logic 0 is output via the output port OUT2.

Condition 2: When the logic 0 is input to the input port IN2, the logical high level is output via the output port OUT1.

Condition 3: When the logic 0 is input to the input port IN2 and the logical level input to the input port IN1 transitions from the logical high level to the logical low level, the logical level output via the output port OUT1 is held at the logical high level and the logic output via the output port OUT2 is held at the logic 1. The logic holding operation is performed until the logical level input to the input port IN1 transitions from the logical low level to the logical high level irrespective of the logical state of the input to the input port IN2.

Condition 4: When the logical high level is input to the input port IN1 and the logic input to the input port IN2 transitions from the logic 0 to the logic 1, the logical level output via the output port OUT1 is held at the logical low level and the logic output via the output port OUT2 is held at the logic 0. The logic holding operation is performed until the logic input to the input port IN2 transitions from the logic 1 to the logic 0 irrespective of the logical state of the input to the input port IN1.

Condition 5: After the conditions 3 and 4 are satisfied, the logic output via the output port OUT2 is set at the logic 1 when the logical level input to the input port IN1 is the logical low level, and the logical level output via the output port OUT1 is set at the logical low level when the logic input to the input port IN2 is the logic 1.

The wireless communication unit 440 including the transmitters $403_1$ and $403_2$ and the receivers $404_1$ and $404_2$ illustrated in FIG. 4 has a logical sum configuration. When at least one logic 1 is input to the wireless communication unit 440, the logic 1 is output to the input port IN2 of both the logic circuits $402_1$ and $402_2$ connected to the wireless communication unit 440. That is, only when the input from the logic circuits $402_1$ and $402_2$ connected to the wireless communication unit 440 is the logic 0, the logic 0 is input to the input port IN2 of both the logic circuits $402_1$ and $402_2$ connected to the wireless communication unit 440.

The following description will be made of the actions of the signal transmission apparatuses $400_1$ and $400_2$ in the communication performed by the signal transmission system 450, more specifically, transmission of data from the electronic control unit $300_0$ to the electronic control unit $300_1$. Transmission of data from the electronic control unit $300_1$ to the electronic control unit $300_2$ will not be described because the actions of the signal transmission apparatuses $400_1$ and $400_2$ are simply reversed but are basically the same.

Figures 8A, 8B:
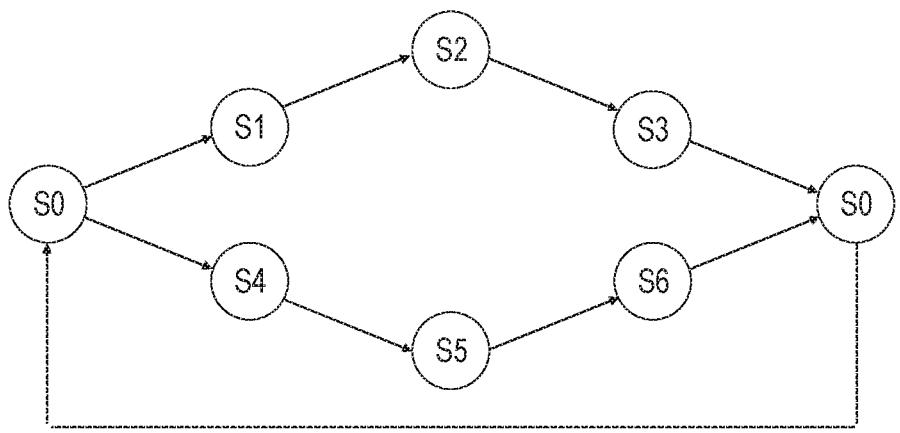
FIG. 8A illustrates a truth table of the input to and the output from each logic circuit.
FIG. 8B is a descriptive diagram illustrating the transition of the states of the logic circuits.
Figure 9A:
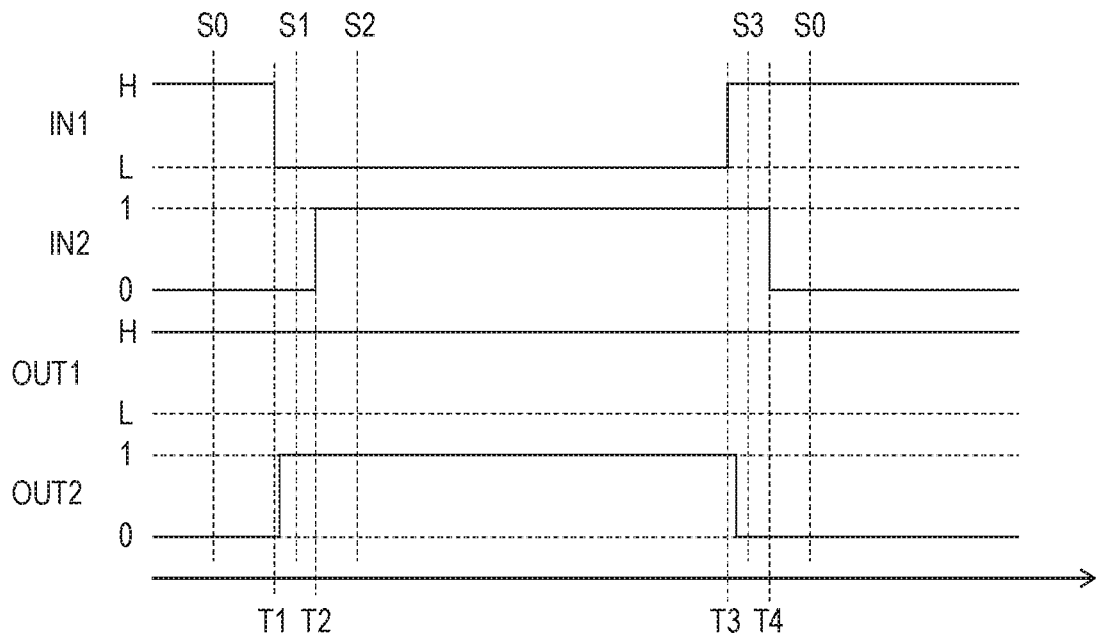
FIG. 9A is a time chart illustrating the action of the logic circuit in one of the signal transmission apparatuses.
Figure 9B:
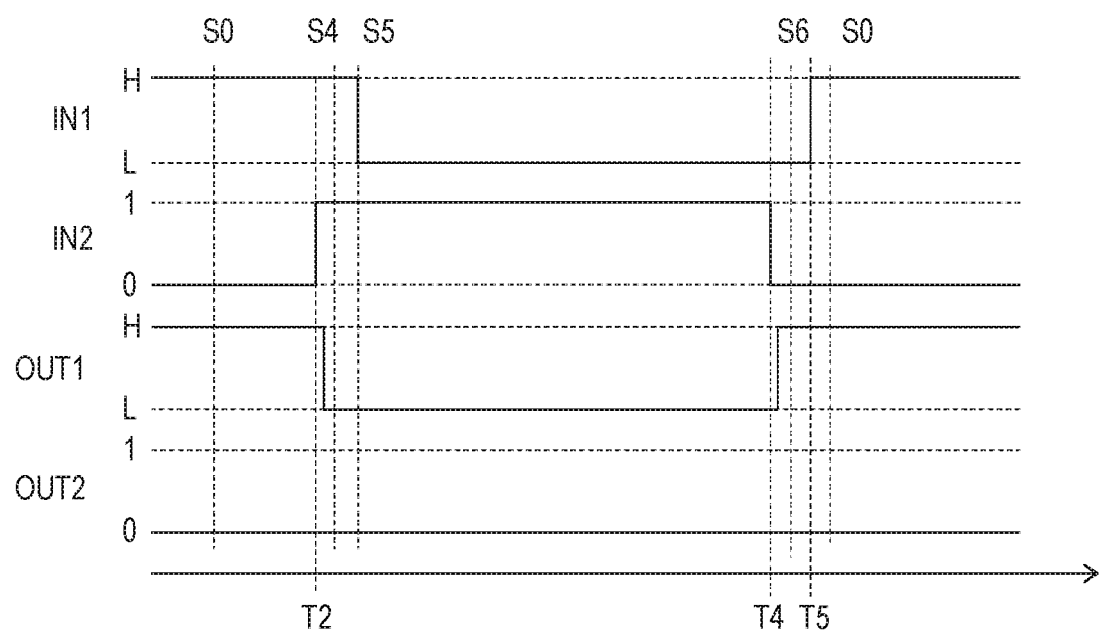
FIG. 9B is a time chart illustrating the action of the logic circuit in the other signal transmission apparatus.

FIGS. 6A to 6D are descriptive diagrams illustrating the actions of the signal transmission apparatuses $400_1$ and $400_2$ in the transmission of a signal from the bus wire $310_1$, which part of the bus wire 310, to the bus wire $310_2$, which is another part of the bus wire 310. FIGS. 7A to 7D are descriptive diagrams illustrating the actions of the signal transmission apparatuses $400_1$ and $400_2$ at the end of the transmission of the signal from the bus wire $310_1$, which part of the bus wire 310, to the bus wire $310_2$, which is another part of the bus wire 310. FIG. 8A illustrates a truth table of the input to and the output from each of the logic circuits. FIG. 8B is a descriptive diagram illustrating the transition of the state of each of the logic circuits. FIG. 9A is a time chart illustrating the action of the logic circuit in one of the signal transmission apparatuses. FIG. 9B is a time chart illustrating the action of the logic circuit in the other signal transmission apparatus.

Figure 6A:
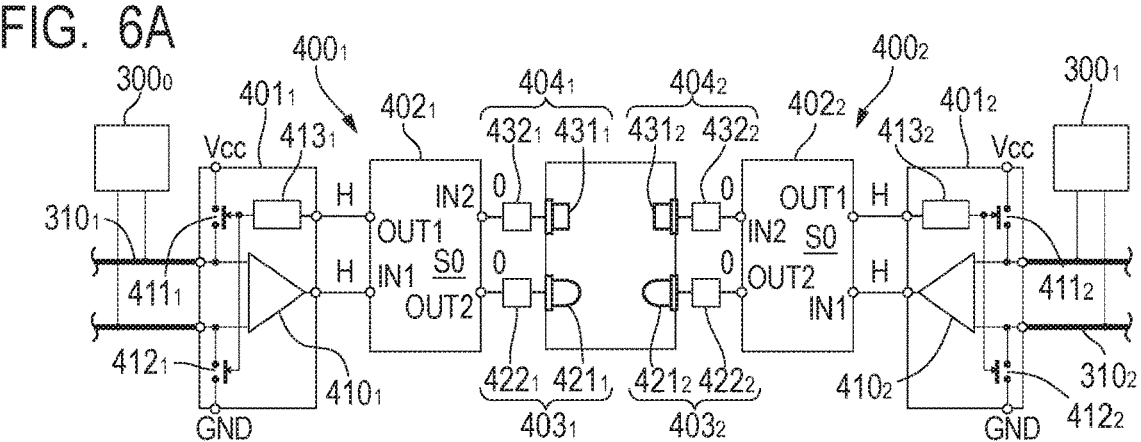
FIG. 6A is a descriptive diagram illustrating the action of signal transmission apparatuses in the transmission of a signal from one bus wire to another bus wire.

In FIG. 6A, the bus wires $310_1$ and $310_2$ both operate in the recessive state. That is, since the electronic control unit $300_0$ outputs no differential signals (potential difference), the converters $410_1$ and $410_2$ output the logic signal having the high level H to the logic circuits $402_1$ and $402_2$. The logic circuits $402_1$ and $402_2$ therefore each receive input of the logic signal having the high level H via the input port IN1 and input of the logic-0 flag via the input port IN2.

When the logical level input to the input port IN1 is the high level H and the logic input to the input port IN2 is the logic 0, the logic circuit $402_1$ sets the logical level output via the output port OUT1 to be the high level H and the logic output via the output port OUT2 to be the logic 0 (state S0), as illustrated in FIG. 8A.

That is, in the input state illustrated in FIG. 6A, the logic circuit $402_1$ outputs the logic signal having the high level H via the output port OUT1 to the driver $413_1$ and outputs the logic-0 flag via the output port OUT2 to the transmitter $403_1$, as illustrated in FIG. 8A. The driver $413_1$ receives the input of the logic signal having the high level H and turns off the transistors $411_1$ and $412_1$. The transmitter $403_1$ receives the input of the logic-0 flag and transmits no radio signal. The same holds true for the logic circuit $402_2$. At this point, the logic circuits $402_1$ and $402_2$ operate in the S0 state, as illustrated in FIGS. 8B, 9A, and 9B.

The transition of the states of the logic circuits $402_1$ and $402_2$ differ from each other depending on whether the logic circuits transmit or receive a data signal. Specifically, the upper route in FIG. 8B illustrates the transition of the state of the logic circuit $402_1$, and the lower route in FIG. 8B illustrates the transition of the state of the logic circuit $402_2$.

Figure 6B:
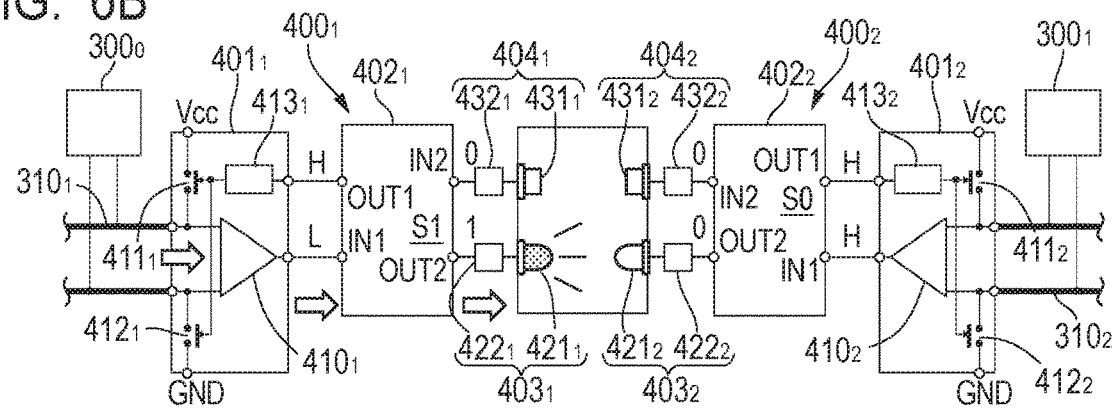
FIG. 6B is a descriptive diagram illustrating the action of the signal transmission apparatuses in the transmission of the signal from the one bus wire to the other bus wire.

In a case where the electronic control unit $300_0$ outputs differential signals to the bus wire $310_1$, so that the bus wire $310_1$ transitions from the recessive state to the dominant state, the converter $410_1$ outputs the logic signal having the low level L to the logic circuit $402_1$, as illustrated in FIG. 6B. In FIG. 9A, the input of the logic signal to the input port IN1 transitions from the high level H to the low level L at the timing T1. The logic signal having the low level L is therefore input from the converter $410_1$ to the logic circuit $402_1$ via the input port IN1 with the logic-0 flag input to the logic circuit $402_1$ via the input port IN2.

When the logical level input to the input port IN1 is the low level L and the logic input to the input port IN2 is the logic 0, the logic circuit $402_1$ sets the logical level output via the output port OUT1 to be the high level H and the logic output via the output port OUT2 to be the logic 1 (state S1), as illustrated in FIG. 8A. That is, in a case where the logic signal having the low level L is input to the logic circuit $402_1$ from the converter $410_1$ with no logic-1 flag (but logic-0 flag) input to the logic circuit $402_1$ from the receiver $404_1$, the logic circuit $402_1$ outputs the logic 1, which is the transmission flag, to the transmitter $403_1$. More specifically, in the input state illustrated in FIG. 6B, the logic circuit $402_1$ outputs the logic signal having the high level H to the driver $413_1$ via the output port OUT1 and outputs the logic-1 flag representing the transmission flag to the transmitter $403_1$ via the output port OUT2. As described above, the logic circuit $402_1$ causes the light emitting element $421_1$ of the transmitter $403_1$ to transmit the optical signal but the transistors $411_1$ and $412_1$ to keep operating in the OFF state.

Figure 6C:
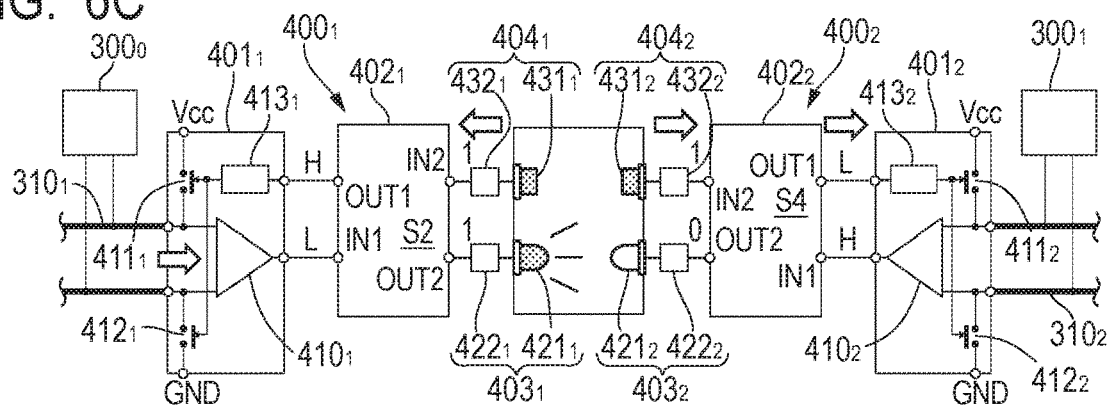
FIG. 6C is a descriptive diagram illustrating the action of the signal transmission apparatuses in the transmission of the signal from the one bus wire to the other bus wire.

Since the input of the logic-1 flag is input to the light emission circuit $422_1$ in the transmitter $403_1$, and the light emitting element $421_1$ emits light having intensity greater than the predetermined value, the light receiving elements $431_1$ and $431_2$ in the receivers $404_1$ and $404_2$ receive the optical signals, as illustrated in FIG. 6C. The light reception circuits $432_1$ and $432_2$ in the receivers $404_1$ and $404_2$ therefore output the logic-1 flag representing the reception flag to the logic circuits $402_1$ and $402_2$.

At this point, the logic-1 flag representing the reception flag is input to the logic circuits $402_1$ and $402_2$ at the timing T2, which is behind the timing T1, when the logic circuits $402_1$ and $402_2$ receive the logic signal having the low level L, as illustrated in FIGS. 9A and 9B.

When the logical level input to the input port IN1 is the low level L and the logic input to the input port IN2 is the logic 1, the logic circuit $402_1$ sets the logical level output via the output port OUT1 to be the high level H and the logic output via the output port OUT2 to be the logic 1 (state S2), as illustrated in the truth table illustrated in FIG. 8A. That is, in the input state illustrated in FIG. 6C, the logic circuit $402_1$ outputs the logic signal having the high level H to the driver $413_1$ via the output port OUT1 and outputs the logic-1 flag representing the transmission flag to the transmitter $403_1$ via the output port OUT2.

As described above, in the case where the logic signal input to the logic circuit $402_1$ from the converter $410_1$ has the low level L with the logic 1 input to the logic circuit $402_1$ from the receiver $404_1$, the logic circuit $402_1$ has received the radio signal from the transmitter $403_1$ of the signal transmission apparatus to which the logic circuit $402_1$ belongs. The logic circuit $402_1$ therefore controls the transistors $411_1$ and $412_1$ to be maintained in the OFF state with the transmission action maintained. The bus wire $310_1$ is therefore not current-driven by the electronic control unit $300_0$ and the signal transmission apparatus $400_1$ at the same time.

Although the transistors $411_1$ and $412_1$ are maintained in the OFF state, the bus wire $310_1$ operates in the dominant state because the electronic control unit $300_0$ supplies differential signals. When the electronic control unit $300_0$ stops supplying the differential signals, the bus wire $310_1$ transitions from the dominant state to the recessive state because the transistors $411_1$ and $412_1$ are maintained in the OFF state. A situation in which the signal transmission apparatus $400_1$ itself accidentally sets the state of the bus wire $310_1$ to be the dominant state can thus be avoided.

On the other hand, when the logical level input to the input port IN1 is the high level H and the logic input to the input port IN2 is the logic 1, the logic circuit $402_2$ sets the logical level output via the output port OUT1 to be the low level L and the logic output via the output port OUT2 to be the logic 0 (state S4), as illustrated in the truth table illustrated in FIG. 8A. That is, at the timing T2 illustrated in FIG. 9B, the logic signal input from the converter $410_2$ to the logic circuit $402_2$ has the state having the high level H. In this input state, when the flag input from the receiver $404_2$ transitions from the logic 0 to the logic 1, the logic circuit $402_2$ switches the logical level of the logic signal to be output to the driver $413_2$ from the high level H to the low level L (state S4). That is, in the input state illustrated in FIG. 6C, the logic circuit $402_2$ outputs the logic signal having the low level L to the driver $413_2$ via the output port OUT1 and outputs the logic-0 flag representing the non-transmission flag to the transmitter $403_2$ via the output port OUT2.

Figure 6D:
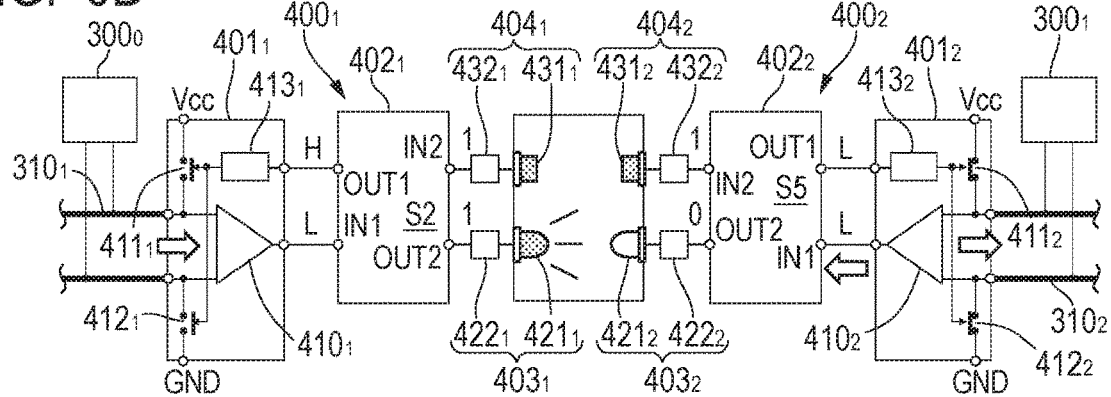
FIG. 6D is a descriptive diagram illustrating the action of the signal transmission apparatuses in the transmission of the signal from the one bus wire to the other bus wire.

The driver $413_2$ to which the logic signal having the low level L has been input turns on the transistors $411_1$ and $412_1$, as illustrated in FIG. 6D. The bus wire $310_2$ therefore transitions from the recessive state to the dominant state. The electronic control unit $300_0$ then inputs differential signals to the electronic control unit $300_1$. Since the bus wire $310_2$ has transitioned from the recessive state to the dominant state, the converter $410_2$ sets the logical level of the logic signal to be output to the logic circuit $402_2$ to be the low level L.

When the logical level input to the input port IN1 is the low level L and the logic input to the input port IN2 is the logic 1, the logic circuit $402_2$ sets the logical level output via the output port OUT1 to be the low level L and the logic output via the output port OUT2 to be the logic 0 (state S5), as illustrated in the truth table illustrated in FIG. 8A. That is, in the input state illustrated in FIG. 6D, the logic circuit $402_2$ outputs the logic signal having the low level L to the driver $413_2$ via the output port OUT1 and outputs the logic-0 flag representing the non-transmission flag to the transmitter $403_2$ via the output port OUT2. The logic circuit $402_2$ therefore holds the logical level of the logic signal to be output to the driver $413_2$ at the low level L and holds the flag to be transmitted to the transmitter $403_2$ to be the logic-0 flag until the state of the logic circuit $402_2$ transitions to the state in which the logic circuit $402_2$ receives the logic-0 flag from the receiver $404_2$.

As described above, the logic circuit $402_2$ causes the transmitter $403_2$ to transmit no radio signal even when the logic signal having the low level L is input to the logic circuit $402_2$ from the converter $410_2$ because the electronic control unit $300_1$ has not set the state of the bus wire $310_2$ to be the dominant state. Therefore, even when the bus wire $310_2$ transitions from the recessive state to the dominant state, malfunction of transmission of a radio signal from the transmitter $403_2$ can be avoided.

As described above, when the logic-1 flag is input from the receiver $404_1$ to the logic circuit $402_1$, the logic circuit $402_1$ evaluates whether the radio signal received with the receiver $404_1$ is a radio signal transmitted from the communication counterpart or a radio signal transmitted from the transmitter $403_1$. In the case where the radio signal received with the receiver $404_1$ is a radio signal transmitted from the communication counterpart, the logic circuit $402_1$ operates in such a way the logic signal having the low level L is output to the driver $413_1$. On the other hand, in the case where the radio signal received with the receiver $404_1$ is a radio signal transmitted from the transmitter $403_1$, the logic circuit $402_1$ operates in such a way that the logic signal having the high level H is output to the driver $413_1$. The logic circuit $402_1$ performs the evaluation described above based on whether the logic signal input from the converter $410_1$ has the high level L or the low level L when the logic 1 is input from the receiver $404_1$ to the logic circuit $402_1$. Specifically, when the logic signal has the low level L, the radio signal is a radio signal transmitted from the transmitter $403_1$ of the signal transmission apparatus to which the logic circuit $402_1$ belongs, whereas when the logic signal has the high level H, the radio signal is a radio signal transmitted from the transmitter $403_2$ of the communication counterpart. Therefore, in the CAN bus communication, malfunction of the signal transmission apparatus $400_1$ can be avoided even when a radio signal transmitted from the transmitter $403_1$ of one of signal transmission apparatuses is received with the receiver $404_1$ of the same signal transmission apparatus. The same holds true for the signal transmission apparatus $400_2$ including the logic circuit $402_2$.

A description will next be made of the actions of the signal transmission apparatuses $400_1$ and $400_2$ in the case where the bus wire $310_1$ transitions from the dominant state to the recessive state.

Figure 7A:
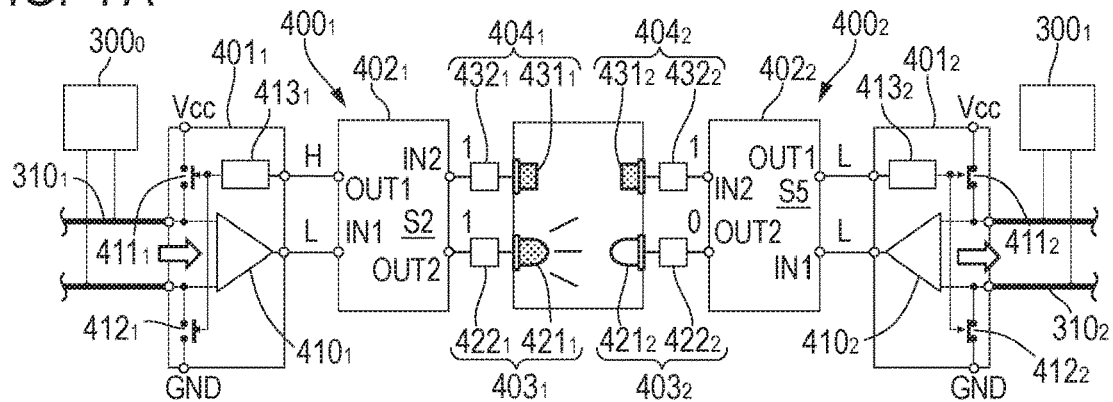
FIG. 7A is a descriptive diagram illustrating the action of the signal transmission apparatuses at the end of the transmission of the signal from the one bus wire to the other bus wire.
Figure 7B:
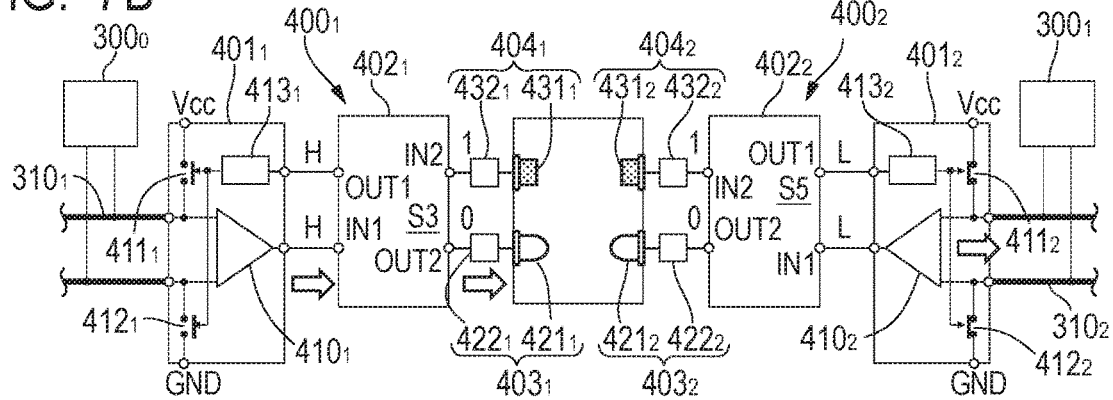
FIG. 7B is a descriptive diagram illustrating the action of the signal transmission apparatuses at the end of the transmission of the signal from the one bus wire to the other bus wire.

When the bus wire $310_1$ transitions from the dominant state illustrated in FIG. 7A to the recessive state illustrated in FIG. 7B, the converter $410_1$ changes the logic signal to be output to the logic circuit $402_1$ from the low level L to the high level H. In FIG. 9A, the logic signal input to the input port IN1 transitions from the low level L to the high level H at the timing T3. The logic signal having the high level H is therefore input from the converter $410_1$ to the logic circuit $402_1$ with the logic-1 flag input from the receiver $404_1$ to the logic circuit $402_1$.

In the present embodiment, when the logical level input to the input port IN1 is the high level H and the logic input to the input port IN2 is the logic 1, the logic circuit $402_1$ sets the logical level output via the output port OUT1 to be the high level H and the logic output via the output port OUT2 to be the logic 0 (state S3), as illustrated in FIG. 8A.

At this point, the transmitter $403_1$ lowers the intensity of the emitted light after the logic-0 flag is output from the logic circuit $402_1$. The receiver $404_1$ then outputs the logic-0 flag to the logic circuit $402_1$ after the intensity of the received emitted light lowers. It is therefore determined that the bus wire $310_1$ receives the radio signal in the recessive state from the point of time when the logic signal having the high level H is input from the converter $410_1$ to the logic circuit $402_1$ to the point of time when the logic-0 flag is input from the receiver $404_1$ to the logic circuit $402_1$. The logic circuit $402_1$ should therefore avoid false recognition that the received radio signal has been transmitted from the communication counterpart.

The timing T3 in FIG. 9A is the point of time when the logic signal input from the converter $410_1$ to the logic circuit $402_1$ transitions from the low level L to the high level H with the logic-1 flag input from the receiver $404_1$ to the logic circuit $402_1$. Further, the timing T4 in FIG. 9A is the point of time when the logical flag input from the receiver $404_1$ to the logic circuit $402_1$ switches from the logic 1 to the logic 0.

Figure 7C:
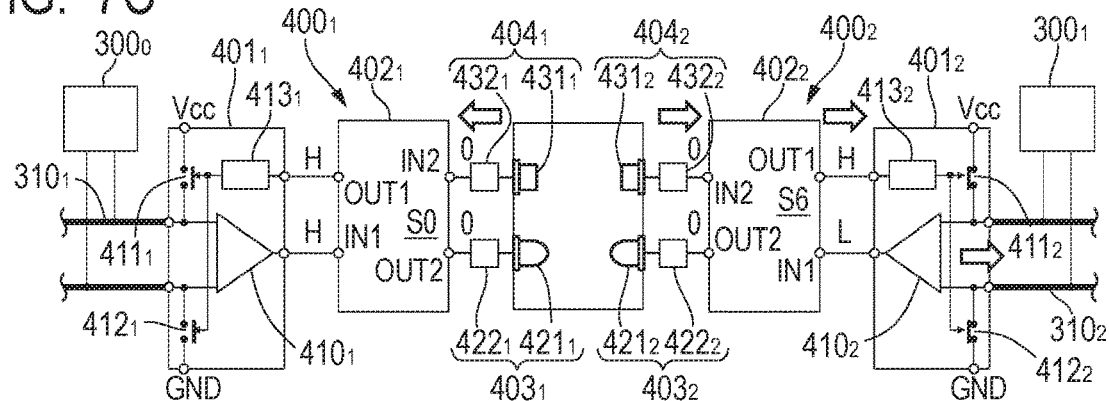
FIG. 7C is a descriptive diagram illustrating the action of the signal transmission apparatuses at the end of the transmission of the signal from the one bus wire to the other bus wire.

The logic circuit $402_1$ holds the logic signal to be output to the driver $413_1$ at the high level H for the period from the timing T3 to the timing T4, as illustrated in FIG. 7C. Since the logic signal to the driver $413_1$ is held at the high level H, the transistors $411_1$ and $412_1$ are held in the OFF state, and the bus wire $310_1$ is held in the recessive state. Therefore, in the signal transmission apparatus $400_1$, accidental change of the state of the bus wire $310_1$ to the dominant state for the period from the timing T3 to the timing T4 can be avoided.

On the other hand, the logic circuit $402_2$ outputs the logic signal having the high level H via the output port OUT1, as illustrated in FIG. 7C, when the flag input from the receiver via the input port IN2 transitions from the logic 1 to the logic 0 at the timing T4 illustrated in FIG. 9B. The logic circuit $402_2$ outputs the logic signal having the high level H in order to switch the state of the bus wire $310_2$ from the dominant state to the recessive state because there is no radio signal from the communication counterpart.

Specifically, when the logical level input to the input port IN1 is the low level L and the logic input to the input port IN2 is the logic 0, the logic circuit $402_1$ sets the logical level output via the output port OUT1 to be the high level H and the logic output via the output port OUT2 to be the logic 0 (state S6), as illustrated in FIG. 8A.

The driver $413_2$ switches the states of the transistors $411_2$ and $412_2$ to the OFF state in response to the input of the logic signal having the high level H. The state of the bus wire $310_2$ therefore changes to the recessive state. In response to the change of the state of the bus wire $310_2$ to the recessive state, the converter $410_2$ switches the logical level of the logic signal to be output to the logic circuit $402_2$ from the low level L to the high level H.

The timing T4 in FIG. 9B is the point of time when the flag input from the receiver $404_2$ to the logic circuit $402_2$ transitions from the logic 1 to the logic 0 with the logic signal input from the converter $410_2$ to the logic circuit $402_2$. Further, the timing T5 in FIG. 9B is the point of time when the logic signal input from the converter $410_2$ to the logic circuit $402_2$ transitions from the low level L to the high level H.

Figure 7D:
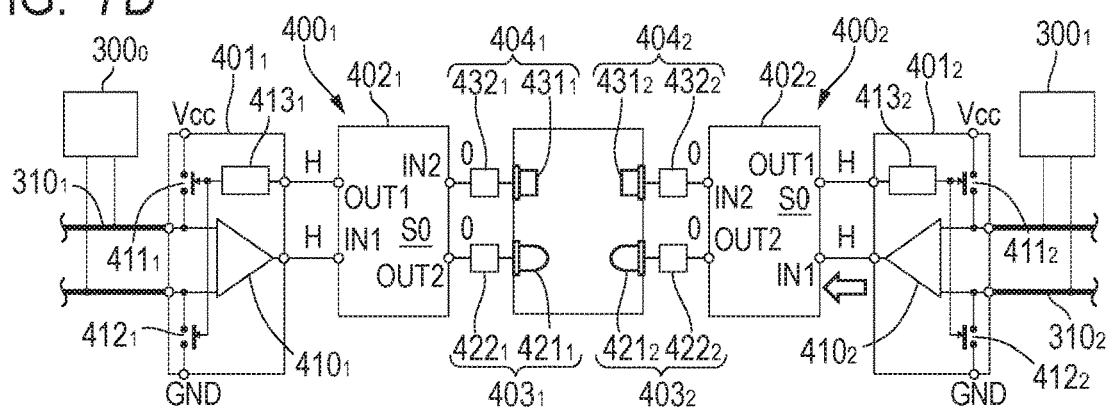
FIG. 7D is a descriptive diagram illustrating the action of the signal transmission apparatuses at the end of the transmission of the signal from the one bus wire to the other bus wire.

For the period from the timing T4 to timing T5, there is no radio signal from the communication counterpart, but the bus wire $310_2$ operates in the dominant state. The logic circuit $402_2$ therefore outputs no transmission flag to the transmitter $403_2$, that is, outputs the logic-0 flag for the period from the timing T4 to the timing T5, that is, until the logic signal having the high level H is input to the logic circuit $402_2$, as illustrated in FIG. 7D. Therefore, for the period from the timing T4 to timing T5, the logic circuit $402_2$ can avoid false recognition that data has been transmitted from the electronic control unit $300_1$, whereby malfunction of the signal transmission apparatus $400_2$ can be avoided.

In response to the input of the logic signal having the high level H, the logic circuit $402_2$ sets the logical level output via the output port OUT1 to be the high level H and the logic output via the output port OUT2 to be the logic 0 (state S0).

Figure 10A:
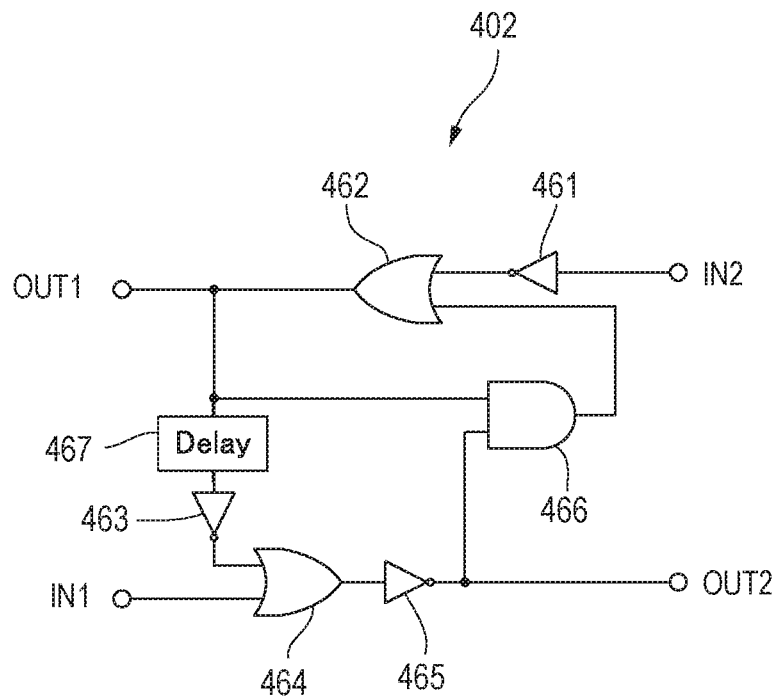
FIG. 10A is a circuit diagram illustrating the configuration of each of the logic circuits.
Figure 10B:
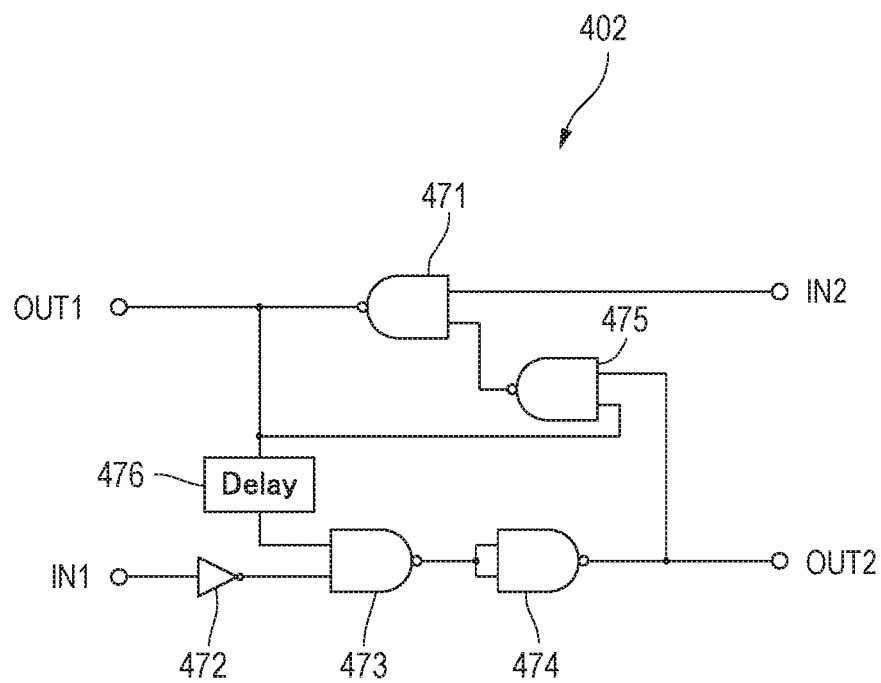
FIG. 10B is another circuit diagram illustrating the configuration of each of the logic circuits.

In the present embodiment, the logic circuit $402_1$ and $402_2$ each include a plurality of logic elements. FIGS. 10A and 10B are circuit diagrams illustrating the configurations of the logic circuits.

The logic circuit $402_1$ and $402_2$ each have one of the circuit configurations illustrated in FIGS. 10A and 10B. In FIGS. 10A and 10B, the logic circuit $402_1$ and $402_2$ are each drawn in the form of a logic circuit 402.

In FIG. 10A, the logic circuit 402 includes a plurality of logic elements 461 to 466 and a delay circuit 467. The logic element 461 is a NOT element. The logic element 462 is an OR element. The logic element 463 is a NOT element. The logic element 464 is an OR element. The logic element 465 is a NOT element. The logic element 466 is an AND element.

In FIG. 10B, the logic circuit 402 includes a plurality of logic elements 471 to 475 and a delay circuit 476. The logic elements 471 and 473 to 475 are each an AND element. The logic element 472 is a NOT element.

Irrespective of the circuit configurations illustrated in FIGS. 10A and 10B employed by each of the logic circuit $402_1$ and $402_2$, the logic circuits $402_1$ and $402_2$ can each be achieved by basic logic gates and can therefore be each readily formed at low cost.

Further, in the processors $401_1$ and $401_2$ and the optical transmission circuits of the wireless communication unit 440, it takes time for a signal to propagate, and delay time by which the signal propagation is delayed needs to be considered. In the present embodiment, one of the delay circuit 467 illustrated in FIG. 10A and the delay circuit 476 has the function of correcting the delay. The delay circuits 467 and 476 can each be readily achieved, for example, by a lowpass filter including a resistor and a capacitor and each do not necessarily have a specific configuration as long as the amount of delay roughly equal to the delay described above is provided. The logic circuit $402_1$ and $402_2$ each do not necessarily have the configuration illustrated in one of FIGS. 10A and 10B and only need to have the function described above, and the logic circuit $402_1$ and $402_2$ may not have the same configuration.

The present invention is not limited to the embodiment described above, and many variations are conceivable within the technical sprit of the present invention. Further, the effects described in the embodiment are only a list of most preferable effects provided by the present invention, and the effects provided by the present invention are not limited to those described in the embodiment.

In the embodiment described above, the description has been made of the case where optical communication is performed between a transmitter and a receiver, but not necessarily. Optical communication can be performed, but the communication may be performed based on one of a radio wave, an electric field, and a magnetic field. For example, the transmitter may be formed of a resonator and a modulator, and the receiver may be formed of a resonator and a demodulator.

In the embodiment described above, the description has been made of the case where an I-letter-shaped bus wire is used in the signal transmission system. For example, one of a T-letter-shaped branched bus wire and a Y-letter-shaped branched bus wire can instead be used in the signal transmission system.

In the embodiment described above, the description has been made of the case where the signal transmission system is incorporated in a rotary joint of the robot arm, but not necessarily, and the signal transmission system may be incorporated in a rotary portion of the end effector, such as the robot hand. Further, the signal transmission system may not necessarily be incorporated in a rotary joint and may be incorporated a portion of the robot where wireless communication is necessary. Moreover, the signal transmission system is not necessarily incorporated in the robot apparatus and can be incorporated in any instrument in general that requires wireless communication in bus communication.

OTHER EXAMPLES

The present invention has been described based on the above-mentioned examples, but it is understood that the present invention should not be limited to the examples described above. The scope of the present invention set forth in the claims should be so widely interpreted that the present invention encompasses all the examples and configurations and functions equivalent thereto.

The present invention can also be implemented in the form of the process of supplying one of a system and an apparatus with a program that achieves at least one of the functions of the embodiment described above via one of a network and a storage medium and causing at least one processor in a computer of one of the system and the apparatus to read and execute the program. The present invention can still instead be achieved in the form of a circuit (ASIC, for example) that achieves at least one of the functions.

The present invention can prevent malfunction in bus communication even when a radio signal transmitted from a transmitter of an apparatus is received with a receiver of the same apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A signal transmission apparatus comprising:
a processor connected to a bus wire including a pair of signal lines;
a controller connected to the processor; and
a transmitter and a receiver connected to the controller,
wherein the processor produces a logic signal representing that a signal is present or representing that there is no signal,
the receiver produces a signal representing one of a reception flag and a non-reception flag in accordance with a received radio signal,
the controller controls a state of transmission of a radio signal from the transmitter based on the logic signal produced by the processor and the signal produced by the receiver, and
the controller is adapted to receive input of the logic signal from the processor and the reception flag from the receiver and produce a logic signal to be output to the processor and a transmission flag to be output to the transmitter.

2. The signal transmission apparatus according to claim 1, wherein:
in a case where no reception flag is input from the receiver to the controller but the logic signal is input from the processor to the controller, the transmission flag is output to the transmitter, in a case where the reception flag is input from the receiver to the controller and the radio signal received with the receiver is a radio signal transmitted from a communication counterpart, a logic signal is output to the processor, and
in a case where the reception flag is input from the receiver to the controller and the radio signal received with the receiver is a radio signal transmitted from the transmitter, a logic signal is output to the processor.

3. The signal transmission apparatus according to claim 2, wherein the controller evaluates whether the radio signal received with the receiver is a radio signal transmitted from a communication counterpart or a radio signal transmitted from the transmitter when the reception flag is input from the receiver to the controller based on the logic signal input from the processor.

4. The signal transmission apparatus according to claim 1, wherein the processor includes:
a converter that outputs the logic signal to the controller in a case of a dominant state in which a potential difference in the bus wire is relatively high and outputs the logic signal to the controller in a case of a recessive state in which the potential difference in the bus wire is relatively low;
a first switching element that is connected to one of the pair of signal lines that form the bus wire and a power line to which DC voltage is applied in such a way that the first switching element is disposed between the one signal line and the power line, causes the one signal line and the power line to be electrically continuous with each other when the first switching element operates in an ON state, and cuts the electrical continuity between the one signal line and the power line when the first switching element operates an OFF state;
a second switching element that is connected to another of the pair of signal lines that form the bus wire and a ground line in such a way that the second switching element is disposed between the other signal line and the ground line, causes the other signal line and the ground line to be electrically continuous with each other when the second switching element operates in an ON state, and cuts the electrical continuity between the other signal line and the ground line when the second switching element operates an OFF state; and
a driver that turns off the first and second switching elements in a case where a logic signal is input from the controller to the driver and turns on the first and second switching elements in a case where a logic signal is input from the controller to the driver.

5. The signal transmission apparatus according to claim 2, wherein the controller holds the logic signal to be output to the processor when the logic signal input from the processor to the controller has a state in which no reception flag is input from the receiver to the controller transitions to a state in which the reception flag is input from the receiver to the controller until the state in which the reception flag is input from the receiver to the controller transitions to the state in which no reception flag is input from the receiver to the controller, and the controller outputs no transmission flag to the transmitter.

6. The signal transmission apparatus according to claim 2, wherein:
the receiver is adapted to output, in a case where no radio signal has been received, the non-reception flag representing that no radio signal has been received to the controller, and the controller holds the logic signal to be output to the processor for a period from a point of time when the reception flag is input from the receiver to the controller and the logic signal input from the processor transitions to a point of time when the non-reception flag is input from the receiver to the controller.

7. The signal transmission apparatus according to claim 1, wherein the receiver is adapted to output, in a case where no radio signal has been received, the non-reception flag representing that no radio signal has been received to the controller, and
the controller outputs no transmission flag to the transmitter for a period from a point of time when a state in which the logic signal input from the processor and the reception flag is input to the controller transitions to a state in which the logic signal input from the processor changes.

8. The signal transmission apparatus according to claim 1, wherein the transmitter includes a light emitting element that emits an optical signal as the radio signal, and
the receiver includes a light receiving element that receives the optical signal as the radio signal.

9. The signal transmission apparatus according to claim 1, wherein the controller includes a logic circuit including a plurality of logic elements.

10. The signal transmission apparatus according to claim 1, wherein the signal transmission apparatus further comprises:
a first member; and
a second member that rotates relative to the first member, and
the transmitter and the receiver are disposed in one of the first and second members.

11. The signal transmission apparatus according to claim 10, wherein the first member is a cylindrical member, and
the second member is a shaft member so disposed in the cylindrical member as to be coaxial with the cylindrical member.

12. A signal transmission system comprising a pair of the signal transmission apparatuses according to claim 1.

13. An instrument comprising the signal transmission system according to claim 12.

14. The instrument according to claim 13, further comprising
a robot arm including a rotary joint,
wherein the signal transmission system is incorporated in the rotary joint of the robot arm.

15. A signal transmission system, comprising
a first member provided with a first signal transmission apparatus according to claim 1 and a second member provided with a second signal transmission apparatus according to claim 1,
wherein relative motion between the first member and the second member changes a relative distance between a first transmitter of the first signal transmission apparatus and a second receiver of the second signal transmission apparatus and a relative distance between a second transmitter of the second signal transmission apparatus and a first receiver of the first signal transmission apparatus.

16. A signal transmission apparatus comprising:
a processor connected to a wire including a pair of signal lines;
a controller connected to the processor; and
a transmitter and a receiver connected to the controller,
wherein the processor produces and transmits, to the controller, a first signal representing that a signal is present or a second signal representing that there is no signal, and transmits signals to the wire in accordance with a third signal representing that a signal is present or a fourth signal representing that there is no signal received from the controller,
the receiver outputs, to the controller, a reception flag or a non-reception flag in accordance with a received radio signal, and the controller outputs, to the transmitter, a transmission flag or a non-transmission flag and a signal to the processor in accordance with an input from the processor and the receiver,
wherein the signal transmission apparatus, in a case where the non-reception flag is input to the controller from the receiver, when the input from the processor changes from the second signal to the first signal, the controller transmits the fourth signal to the processor and outputs the transmission flag to the transmitter, and, even in a case where the input from the receiver changes into the reception flag, the controller maintains a state of transmitting the fourth signal to the processor and outputting the transmission flag to the transmitter.

17. The signal transmission apparatus according to claim 16, wherein under the state where the controller receives input of the first signal from the processor and the reception flag from the receiver and outputs the fourth signal to the processor and outputs the transmission flag to the transmitter, when the first signal from the processor changes to the second signal, the controller outputs the non-transmission flag to the transmitter and maintains a state of outputting the fourth signal to the processor during a period of receiving the reception flag from the receiver.

18. The signal transmission apparatus according to claim 17, wherein, in a case where the controller receives the second signal from the processor, when the output of the receiver changes from the non-reception flag to the reception flag, the controller transmits the third signal to the processor and outputs the non-transmission flag to the transmitter, even though the second signal from the logic signal changes to the first signal, the controller maintains a state of transmitting the third signal to the processor and outputting the non-transmission flag to the transmitter.

19. The signal transmission apparatus according to claim 18, wherein, under the state where the controller outputs the non-transmission flag to the transmitter and receives the first signal from the processor and transmits the third signal to the processor, when an input from the receiver changes to the non-reception flag, the controller transmits the fourth signal to the processor, and maintains a state of outputting the non-transmission flag to the transmitter during a period of receiving the second signal from the processor.

20. The signal transmission apparatus according to claim 16, wherein, when the input from the receiver changes from the non-reception flag into the reception flag under a state of receiving the second signal from the processor, the controller outputs the first signal to the processor until changing the input from the receiver into the non-reception flag, and does not output the transmission flag to the transmitter.

21. The signal transmission apparatus according to claim 16, wherein the receiver is configured to output the non-reception flag to the controller at a time of receiving no radio signal, and
the controller outputs the second signal to the processor, during a period from a timing of changing the signal from the processor from the first signal to the second signal until a timing of inputting the non-reception flag, under a state of inputting the reception flag from the receiver.

22. The signal transmission apparatus according to claim 16, wherein the receiver is configured to output the non-reception flag to the controller at a time of receiving no radio signal, and the controller does not output the transmission flag to the transmitter, during a period from a timing of changing the input from the receiver from the reception flag to the non-reception flag until a timing of receiving the second signal from the processor, under a state of receiving the first signal from the processor.

23. The signal transmission apparatus according to claim 16, wherein:

the transmitter includes a light emitting element that emits an optical signal as the radio signal, and the receiver includes a light receiving element that receives the optical signal as the radio signal.

24. The signal transmission apparatus according to claim 16, wherein the controller includes a logic circuit including a plurality of logic elements.

25. The signal transmission apparatus according to claim 16, wherein the signal transmission apparatus further comprises:

a first member; and a second member that rotates relative to the first member, and the transmitter and the receiver are disposed in one of the first and second members.

26. The signal transmission apparatus according to claim 25, wherein:

the first member is a cylindrical member, and the second member is a shaft member so disposed in the cylindrical member as to be coaxial with the cylindrical member.

27. A signal transmission system comprising a pair of the signal transmission apparatuses according to claim 16.

28. An instrument comprising the signal transmission apparatus according to claim 16.

29. The instrument according to claim 28, further comprising:

a robot arm including a rotary joint, wherein the signal transmission apparatus is incorporated in the rotary joint of the robot arm.

* * * * *